(12) United States Patent
Carter

(10) Patent No.: US 12,499,275 B2
(45) Date of Patent: *Dec. 16, 2025

(54) SHARING RIGHTS TO CONTROL ASPECTS OF AN ELECTRONIC MESSAGE

(71) Applicant: Google LLC, Mountain View, CA (US)

(72) Inventor: Bernadette Alexia Carter, Santa Clara, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/642,712

(22) Filed: Apr. 22, 2024

(65) Prior Publication Data
US 2024/0346181 A1 Oct. 17, 2024

Related U.S. Application Data

(63) Continuation of application No. 17/041,985, filed as application No. PCT/US2018/037141 on Jun. 12, 2018, now Pat. No. 11,966,499.

(51) Int. Cl.
H04L 29/06 (2006.01)
G06F 21/60 (2013.01)
(Continued)

(52) U.S. Cl.
CPC ........ *G06F 21/6263* (2013.01); *G06F 21/604* (2013.01); *H04L 51/212* (2022.05);
(Continued)

(58) Field of Classification Search
CPC . G06F 21/6263; G06F 21/604; H04L 51/224; H04L 51/52; H04L 51/212; H04L 63/102
See application file for complete search history.

(56) References Cited

U.S. PATENT DOCUMENTS 5,999,978 A 12/1999 Angal et al.
9,094,360 B1 7/2015 Bapat
(Continued)

FOREIGN PATENT DOCUMENTS

CN 104769629 A 7/2015
CN 107078942 A 8/2017
(Continued)

OTHER PUBLICATIONS

Extended European Search Report for Application No. 22200118.2, mailed on Dec. 13, 2022, 6 Pages.
(Continued)

*Primary Examiner* — Shawnchoy Rahman
(74) *Attorney, Agent, or Firm* — Lowenstein Sandler LLP

(57) ABSTRACT

A server can receive a request from a creator of a message to share one or more rights of the creator of the message with a user referenced in the message. The server can send a notification about the one or more rights to the user referenced in the message, where the one or more rights may specify at least one of: whether the user is to receive feedback notifications of feedback related to the message, whether the user is to control visibility of feedback on the message by users, or whether the user is to control allowing feedback on the messages. The sever can then perform one or more operations related to the message based on the one or more rights accepted by the user.

20 Claims, 8 Drawing Sheets

(51) Int. Cl.
*G06F 21/62* (2013.01)
*H04L 9/40* (2022.01)
*H04L 51/212* (2022.01)
*H04L 51/224* (2022.01)
*H04L 51/52* (2022.01)

(52) U.S. Cl.
CPC ............ *H04L 51/224* (2022.05); *H04L 51/52* (2022.05); *H04L 63/102* (2013.01)

(56) References Cited

U.S. PATENT DOCUMENTS

| | | | |
|---|---|---|---|
| 2005/0251675 | A1 | 11/2005 | Marcjan et al. |
| 2010/0100925 | A1* | 4/2010 | Hinton ................... G06Q 10/00 726/1 |
| 2010/0125798 | A1 | 5/2010 | Brookhart |
| 2012/0110642 | A1 | 5/2012 | Grassel et al. |
| 2012/0118642 | A1 | 5/2012 | Vempati et al. |
| 2014/0020115 | A1 | 1/2014 | Le Chevalier et al. |
| 2014/0068719 | A1* | 3/2014 | Kiukkonen ........... H04W 12/50 726/4 |
| 2015/0100419 | A1* | 4/2015 | Barton ..................... G06N 5/04 705/14.52 |
| 2016/0142382 | A1 | 5/2016 | Ziebell |
| 2016/0315995 | A1 | 10/2016 | Häusler et al. |
| 2017/0041296 | A1 | 2/2017 | Ford et al. |
| 2017/0050617 | A1* | 2/2017 | Penilla ................ B60R 25/2018 |
| 2018/0103038 | A1 | 4/2018 | Burke et al. |
| 2018/0234374 | A1 | 8/2018 | Gray et al. |

FOREIGN PATENT DOCUMENTS

| | | | | |
|---|---|---|---|---|
| EP | 1406186 A1 | 4/2004 | | |
| WO | WO-9742772 A2 | * | 11/1997 | ............ H04M 15/44 |
| WO | WO-03005145 A2 | * | 1/2003 | ............ G06Q 20/367 |

OTHER PUBLICATIONS

Feng, Z., et al., "E-Government Platform Based on Web Services," Computer Engineering, Apr. 20, 2006, vol. 32 (8), pp. 134-137.

Gang, C., et al., "Study on Synchronization Collaboration Platform Based on JXTA Framework," Computer Engineering, Feb. 20, 2006, No. 4, pp. 97-99.

International Preliminary Report on Patentability for International Application No. PCT/US2018/037141, mailed Sep. 28, 2020, 11 Pages.

International Search Report and Written Opinion for International Application No. PCT/US2018/037141, mailed Jan. 24, 2019, 8 Pages.

Office Action for Chinese Application No. CN20188092039, mailed Sep. 4, 2023, 23 Pages.

Office Action for India Patent Application No. 202248011245, dated Jul. 20, 2022, 6 pages.

Office Action for Indian Patent Application No. 202047041639, mailed Sep. 3, 2021, 6 Pages.

Wu, Y., et al., "Study and Design of Activity-Centric Collaborative Plotting Integrated System," Computer Engineering and Design, Nov. 28, 2009, No. 22, pp. 214-218.

Yang, H., "Campus Knowledge Sharing Management System Based on Exchange Mail System," Science Technology Information, Nov. 23, 2011, No. 33, 1 pages.

* cited by examiner

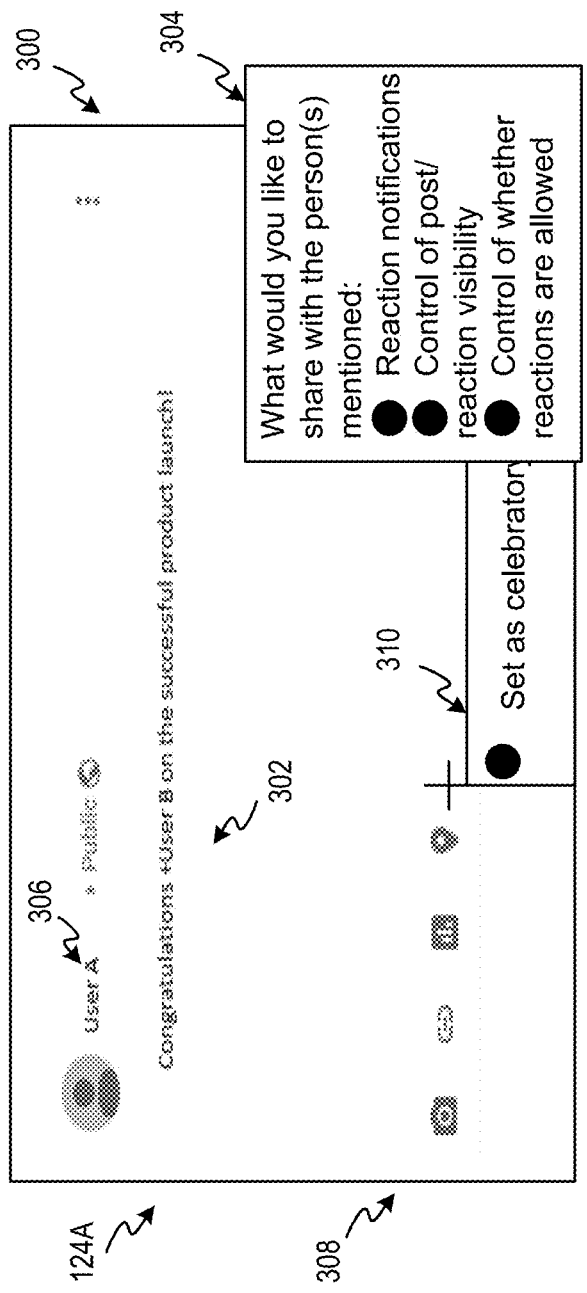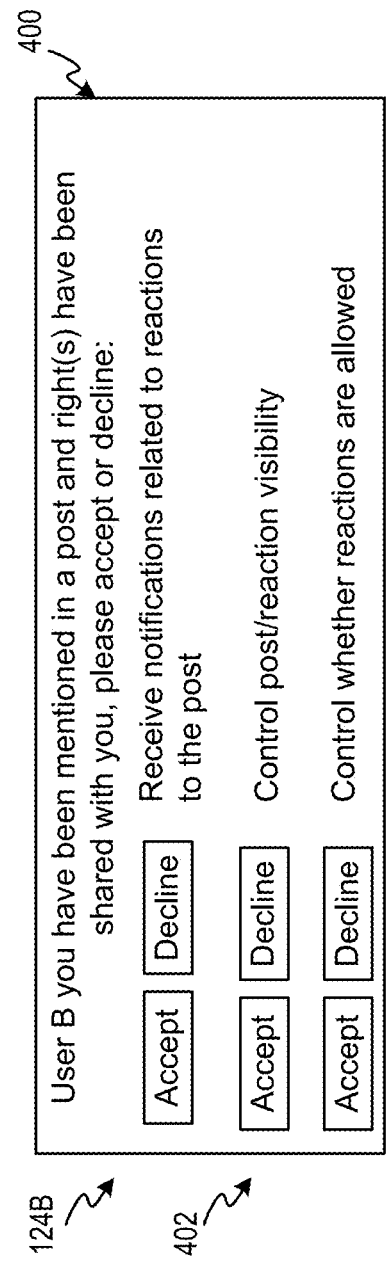

SHARING RIGHTS TO CONTROL ASPECTS OF AN ELECTRONIC MESSAGE

RELATED APPLICATIONS

This application is a continuation of co-pending U.S. patent application Ser. No. 17/041,985, filed Sep. 25, 2020, which is a 371 application of International Application No. PCT/US2018/037141, filed Jun. 12, 2018, each of which is incorporated herein by reference.

TECHNICAL FIELD

Aspects and implementations of the present disclosure relate to electronic documents, and more specifically, to sharing rights to control aspects of an electronic message.

BACKGROUND

Various known messaging platforms exist for users to exchange messages, such as electronic mail (email) systems, social network platforms, video conferencing (e.g., video chat) platforms, etc. Using a messaging platform, a creator may send an electronic message to a user and reference the user in the message. The electronic message may be any suitable message, such as an electronic mail (email) in an email system or a post in a social network platform, among others. For example, a creator may create a post that mentions a user and congratulates that user for a job well done. Other users associated with the creator and/or the user can view the post and reply or react to the post. Likewise, other users copied on the email congratulating/celebrating the user can reply to everyone copied on the email with a response to the email.

SUMMARY

Aspects and implementations of the present disclosure relate to a creator of a message sharing one or more of his/her rights with respect to the message and/or feedback to the message with a user referenced in the message. That is, the techniques enable sharing control typically reserved for a creator of a message with a user referenced in the message. The message may be any suitable message, such as an email in an email system or a post in a social network platform, among others. For example, a creator may enter a post that mentions a user and congratulates that user for a job well done. The creator may set this post as a celebratory/congratulatory post and select one or more rights to share with the user mentioned. Additionally, the content of the post may be analyzed to determine that the post is celebratory/congratulatory and a recommendation may be sent to the creator to share the rights. A notification may be sent to the user mentioned, prompting them to accept or decline the one or more rights.

The rights may include enabling the mentioned user to receive (e.g., reaction, comment, etc.) notifications related to feedback to the post by other users. The rights may include the ability to control whether the post is visible to an entire group the post is shared with or a subset of users (e.g., just the mentioned user, the creator, people in the group with certain titles, etc.) of the group. The rights may also include controlling whether users can provide feedback (e.g., react, comment, etc.) with the post, and the type of feedback allowed for the users.

According to one aspect of the present disclosure there is provided a method comprising: receiving, at a server, a request from a creator of a message to share one or more rights of the creator of the message with a user referenced in the message, wherein the message is for a plurality of users and the user; in response to the request, sending, by the server, a notification to the user referenced in the message, wherein the notification includes an option to accept the one or more rights; receiving, at the server from a user device of the user, an acceptance of the one or more rights; and performing, by the server, one or more operations related to the message based on the one or more rights accepted by the user.

The message may be at least one of a social media post in a social network platform, an email in an email system, or a text or multimedia message in a text messaging platform or a video conferencing platform.

The one or more operations may comprise sending a feedback notification, based on feedback related to the message, to the user based on the one or more rights accepted by the user.

The performing one or more operations may comprise preventing other users of the plurality of users from seeing the message based on a first rule set by the user with respect to the one or more rights, or preventing other users of the plurality of users from seeing feedback to the message based on a second rule set by the user with respect to the one or more rights.

The performing the one or more operations may comprise sending a feedback notification exclusively to the user referenced in the message in response to a second user of the plurality of users providing feedback to the message.

The performing the one or more operations may comprise sending a feedback notification exclusively to the creator and the user referenced in the message in response to a second user of the plurality of users providing feedback to the message.

The receiving, from the user device of the user, the acceptance of the one or more rights may further comprise setting one or more rules specifying one or more of sending notifications related to any responses to the message to a subset of the plurality of users, controlling visibility of the message, controlling visibility of feedback to the message, controlling whether feedback is allowed for the message, controlling what type of feedback is allowed for the message, or controlling who can provide feedback for the message.

The request may include a property indicating the message being of a type of message that specifies to share the one or more rights of the creator of the message with the user identified in the message.

The method may further comprise: analyzing content of the message to identify if the message comprises one or more keywords indicative of a particular type of message; and based on the message comprising at least one of the one or more keywords, sending a second notification to the creator of the message, wherein the second notification inquires whether the creator desires to share the one or more rights with the user and the second request is received as a response to the second notification.

The method may further comprise: receiving, at the server from the user device of the user, a request for the creator to share the one or more rights with the user; and sending a second notification to the creator of the message, wherein the second notification inquires whether the creator desires to share the one or more rights with the user and the second request is received as a response to the second notification.

The one or more rights may specify one or more of whether the user is to receive feedback notifications of feedback related to the message, whether the user is to control visibility of feedback on the message by users, or whether the user is to control allowing feedback on the messages.

The one or more operations may be performed in response to a second user of the plurality of users providing feedback on the message, wherein the feedback comprises a reaction or a comment.

According to another aspect of the present disclosure there is provided a system comprising: a memory device; and a processing device operatively coupled to the memory device, the processing device to: receive a request from a creator of a message to share one or more rights of the creator of the message with a user referenced in the message, wherein the message is for a plurality of users and the user; in response to the request, send a notification to the user referenced in the message, wherein the notification includes an option to accept the one or more rights; receive, from a user device of the user, an acceptance of the one or more rights; and perform one or more operations related to the message based on the one or more rights accepted by the user.

The message may be at least one of a social media post in a social network platform, an email in an email system, or a text or multimedia message in a text messaging platform or a video conferencing platform.

The performing one or more operations may include the processing device further to prevent other users of the plurality of users from seeing the message based on a first rule set by the user with respect to the one or more rights, or preventing other users of the plurality of users from seeing feedback to the message based on a second rule set by the user with respect to the one or more rights.

The receiving, from the user device of the user, the acceptance of the one or more rights may further comprise setting one or more rules specifying one or more of sending notifications related to any responses to the message to a subset of the plurality of users, controlling visibility of the message, controlling visibility of feedback to the message, controlling whether feedback is allowed for the message, controlling what type of feedback is allowed for the message, or controlling who can provide feedback for the message.

The request may include a property indicating the message being of a type of message that specifies to share the one or more rights of the creator of the message with the user identified in the message.

According to another aspect of the present disclosure there is provided a non-transitory, computer readable media storing instructions that, when executed, cause a processing device to perform the method steps described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3 illustrates an example post referencing a user where the post provides options for sharing rights with the referenced user, in accordance with one implementation of the disclosure.

FIG. 4 illustrates an example notification requesting a user referenced in a post to accept or decline shared rights, in accordance with one implementation of the disclosure.

DETAILED DESCRIPTION

Figure 1:
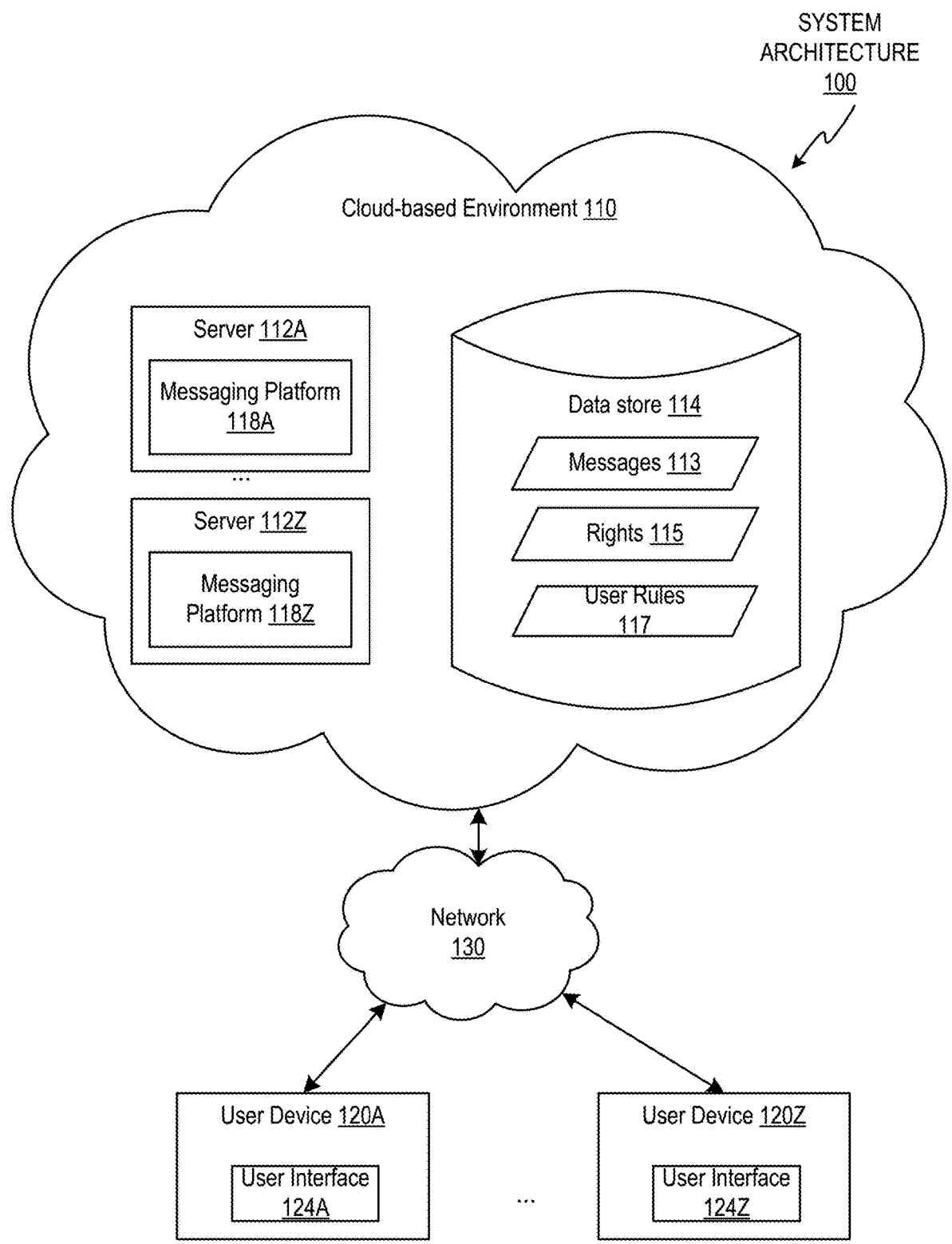
FIG. 1 illustrates an example of a system architecture for implementations of the present disclosure.

Messaging platforms may allow a creator to input an electronic message, reference or mention one or more users in the electronic message, and send the electronic message to a group of people (e.g., including the user, the creator, other users, etc.), among other things. The terms "mention" and "reference" may be used interchangeably herein. Referencing a user in the electronic message may refer to associating the user with the contents of the message. For example, one messaging platform may include an email system and the electronic message may be an electronic mail (email). Another example messaging platform may include a social network platform and the electronic message may be a post on the social network platform. Yet other example messaging platforms may include a text messaging (e.g., text chat) platform or video conferencing (e.g., video chat) platform and the electronic message may be a text message (e.g., Short Message Service (SMS) message) or an image or video message (e.g., Multimedia Messaging Service (MMS) message). In some instances, the creator may congratulate or celebrate the referenced user in the message.

A technical problem which may be addressed by embodiments of the present disclosure is that a large amount of network traffic occurs when a number of messages are created and sent to users in a group within which a congratulatory/celebratory message is sent. For example, when a creator sends an email to congratulate a user and copies a large number of people on the email, oftentimes the people 'reply all' to the email and flood everyone in the group's inboxes. In another example, when a creator makes a post congratulating a user B on a social network, and users C and D "like" the creator's post, network resources may be incurred when informing the creator of the "likes" of users C and D and also when users C and D send their own congratulatory message to user B (because user B may not be notified of the "likes" of users C and D).

Another technical problem which may be addressed by embodiments of the disclosure is protecting certain data from being accessible to certain people. For example, the congratulatory message or the responses to the congratulatory message may include data that the user mentioned in the email does not desire to be shared with the entire group if it is sensitive or confidential.

To address the above identified technical problems embodiments may include a creator of a message sharing rights with a user referenced in the message. The rights may enable the referenced user to set up rules that enable performing one or more operations related to the message and/or to feedback of the message. The rights may enable the user referenced in the message to control the level of engagement with the message that is to be provided to other users. For example, when the message is created and a user is referenced in the message, one or more rights may be shared with the referenced user. The shared rights may be applied by the referenced user to set up rules to receive or not receive notifications related to feedback to the message, to control the visibility of the message and/or feedback on the message by others, to control whether users and/or which users can provide feedback on the message, to control the type of feedback allowed with the message, and/or the like. As such, embodiments of the disclosure may relate to controlling a level of access to data.

Advantageously, embodiments of the present disclosure may reduce the number of messages that are created and sent to users associated with a message. For example, in some instances the mentioned user may set up a rule such that the user and/or creator of the message are the only users of the group to receive feedback notifications to the message, thereby preventing messages from being sent to the other users in the group. Furthermore, considering the example above, by informing user B of the "likes" of users C and D, this operates as a way for user C and D to congratulate user B. Thus, users C and D may not send separate congratulatory messages to user B, which thereby reduces the amount of network resources that may otherwise be incurred.

Furthermore access to data contained in messages and/or feedback to messages may be controlled, thereby protecting the content that the user considers to be private or sensitive. This may prevent the data contained in messages from being accessible to malicious users of a social network (e.g. a third party, a "bot" etc.).

FIG. 1 illustrates an example of a system architecture 100 for implementations of the present disclosure. The system architecture 100 includes a cloud-based environment 110 connected to user devices 120A-120Z via a network 130. A cloud-based environment 110 refers to a collection of physical machines that host applications providing one or more services (e.g., content management) to multiple user devices 120 via a network 130. The network 130 may be public networks (e.g., the Internet), private networks (e.g., a local area network (LAN) or wide area network (WAN)), or a combination thereof. Network 130 may include a wireless infrastructure, which may be provided by one or more wireless communications systems, such as a wireless fidelity (WiFi) hotspot connected with the network 130 and/or a wireless carrier system that can be implemented using various data processing equipment, communication towers, etc. Additionally or alternatively, network 130 may include a wired infrastructure (e.g., Ethernet).

The cloud-based environment 110 may include one or more servers 112A-112Z and a data store 114. The data store 114 may be separate from the servers 112A-112Z and communicatively coupled to the servers 112A-112Z or the data store 114 may be part of one or more of the servers 112A-112Z. In some embodiments, the data store 114 may be included as part of the user devices 120A-120Z. The data store 114 may store messages 113 (e.g., email messages, text or video messages, posts on social network platforms, etc.), rights 115 to control aspects of the messages 113 and/or feedback to the messages 113, and/or user rules 117. Such rights conventionally may be reserved to a creator of the messages 113, but according to techniques of the present disclosure, one or more of the rights 115 may be shared with a user mentioned in a message 113. The disclosure provides a fine grained mechanism to allow a user to control whether the referenced user receives notifications related to responses/reactions to the messages 113 they are referenced in, which users and/or groups can interact (e.g., respond, react, etc.) with the messages 113 they are referenced in, which users and/or groups can view the messages 113 and/or responses/reactions to the messages 113, and so forth.

Thus, the rights 115 may enable the mentioned user to receive notifications related to feedback (e.g., reaction, comment, etc.) to the post by other users, to control whether the post is visible to certain users, to control whether users can provide feedback (e.g., react, comment, etc.) for the messages 113, and/or to control the type of feedback allowed for the users. In some embodiments, the mentioned user may be prompted with a notification that requests the mentioned user to accept the one or more rights that are being shared by the creator. If the user accepts the rights 115, the user can configure one or more user rules 117. The user rules 117 may specify that just the mentioned user is to receive notifications about feedback to the message 113 and not the creator or any other user associated with the group to which the message 113 was sent. Another user rule 117 may specify that just a certain group of users can view the message 113 and/or provide feedback to the message 113. Further, another user rule 117 for the type of feedback allowed to one or more messages 113 can specify that just comments are allowed on the one or more messages 113 but not reactions to the one or more messages 113.

The servers 112A-112Z may be physical machines (e.g., server machines, desktop computers, etc.) that each include one or more processing devices communicatively coupled to memory devices and input/output (I/O) devices. The servers 112A-112Z may host a messaging platform (118A-118Z). The messaging platform 118 may be an electronic mail system, a social network platform, a text messaging platform, a video messaging platform, a video conference platform, or the like. The messaging platform 118 may be implemented as computer instructions that are executable by one or more processing devices on each of the servers 112A-112Z. In alternative implementations, the messaging platforms 118A-118Z may be installed on the user devices 120A-120Z (e.g., as a standalone application) and operate as peers in a peer-to-peer environment. In yet alternative implementations, applications on the user devices 120A-120Z may interact with the messaging platform 118 and may perform some of the functionality of the messaging platform 118.

One or more of the servers 112A-112Z may host the messaging platform 118A-118Z. The server 112A-112Z selected to host the messaging platform 118A-118Z may be based on certain load-balancing techniques, service level agreements, performance indicators, or the like. It should be understood that the servers 112A-112Z of the cloud-based environment 110 host the messaging platforms 118A-118Z, and thus, the messaging platforms 118A-118Z may be referred to as cloud-based messaging platforms 118A-118Z herein.

The messaging platform 118A-118Z may enable a creator to create, edit, view, and/or send a message 113 within a respective user interface 124A-124Z. The messaging platform 118A-118Z may also enable the creator to reference one or more users in the message 113 and select an option to make the message 113 a particular message type (e.g., celebratory, congratulatory, etc.) within the respective user interface 124A-124Z and request that one or more rights 115 be shared with the user referenced in the message 113. The messaging platform 118A-118Z may also enable the creator to receive notifications when the user requests the rights 115, when the user accepts or declines the rights 115, when other users provide feedback to the messages 115, and so forth, within the user interface 124A-124Z. The messaging platform 118A-118Z may also enable a user to accept the shared rights 115 via a notification provided within the respective user interface 124A-124Z. The messaging platform 118A-118Z may also enable a user to set up user rules 117 for the messages 113 within the respective user interface 124A-124Z. The messaging platform 118A-118Z may also enable a user to receive notifications when other users provide feedback to the messages 113 in which the user is referenced within the respective user interface 124A-124Z. The messaging platform 118A-118Z may also enable a user to select various other options related to the message (e.g., request the rights 115 to the message 113) within the respective user interface 124A-124Z. The messaging platform 118A-118Z may also analyze content of a message to determine whether it is a particular message type (e.g., celebratory), and if so determined to be that particular message type, provide a notification to a creator to share rights 115 with a user referenced in the message 113.

The messaging platform 118A-118Z may also enable users (e.g., the message creator, the referenced user, other users associated with the message 113) using different user devices 120A-120Z to simultaneously access the messages 115 to comment on, react (e.g., like, dislike, laugh, upset, etc.) to, and/or view the message 113 in a respective user interface 124A-124Z that presents the message 113 and/or feedback to the message 113. In an implementation, the user interfaces 124A-124Z of the messaging platform 118A-118Z may be web pages rendered by a web browser and displayed on the user device 120A-120Z in a web browser window. In another implementation, the user interfaces 124A-124Z may be displayed by a mobile application or a desktop application. For example, the user interfaces 124A-124Z may be displayed by a native application executing on the user device 120A-120Z. The native application may be separate from a web browser.

The user devices 120A-120Z may include one or more processing devices communicatively coupled to memory devices and I/O devices. The user devices 120A-120Z may be desktop computers, laptop computers, tablet computers, mobile phones (e.g., smartphones), or any suitable computing device. As discussed above, the user devices 120A-120Z may each include a web browser and/or a client application (e.g., a mobile application or a desktop application).

Figure 2:
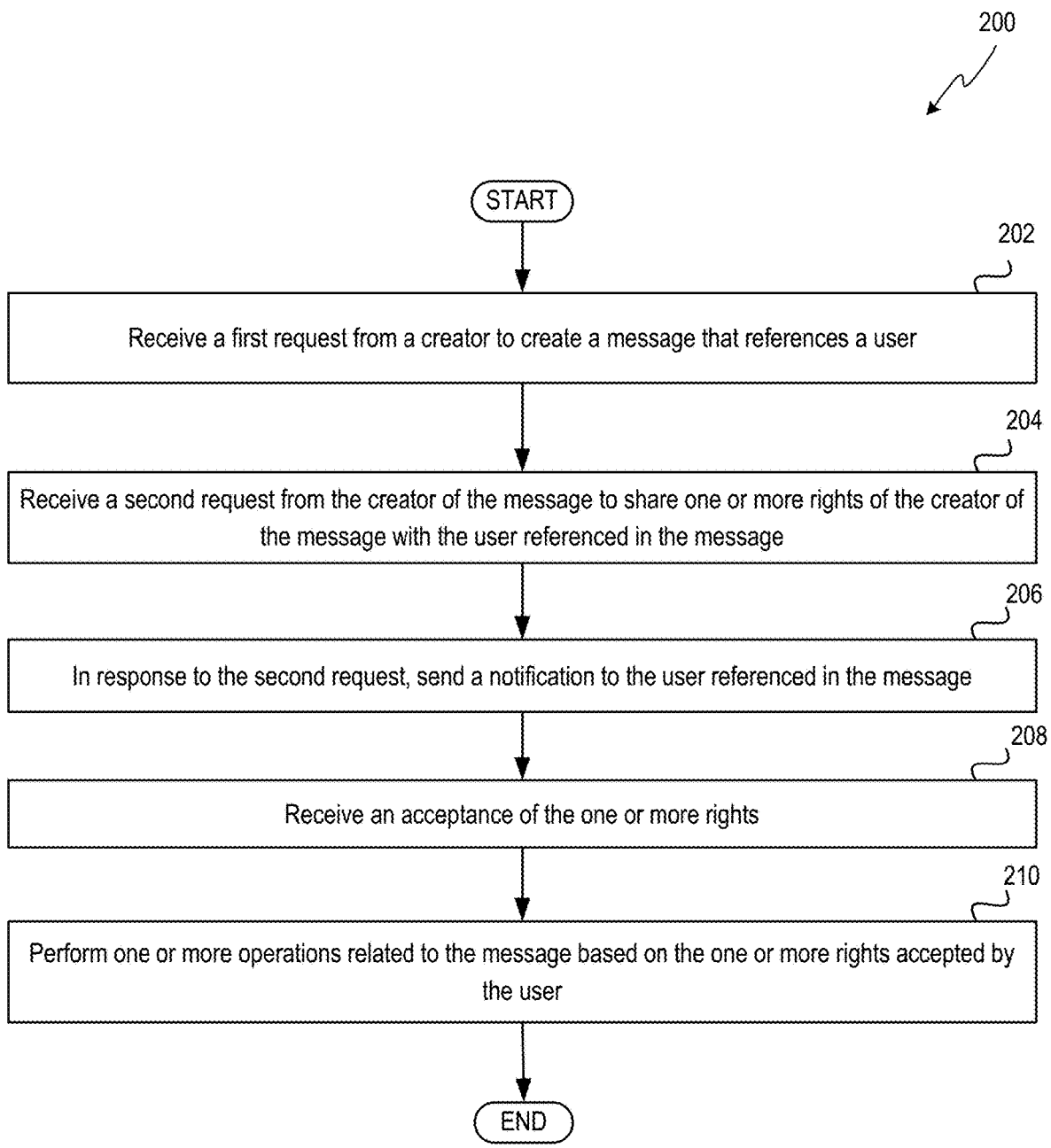
FIG. 2 depicts a flow diagram of aspects of a method for sharing one or more rights of a creator of a message with a user referenced in the message, in accordance with one implementation of the disclosure.

FIG. 2 depicts a flow diagram of aspects of a method 200 for sharing one or more rights 115 of a creator of a message 113 with a user referenced in the message 113, in accordance with one implementation of the disclosure. It should be noted that the user device 120A and the user interface 124A are used for discussion related to a creator, the user device 120B and the user interface 124B are used for discussion related to a user referenced in the message 113, and a user device 120C and the user interface 124C are used for discussion related to other users to which the message is sent. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by the messaging platform 118A-118Z executed by one or more processing devices of the server 112A-112Z. In another implementation, method 200 may be executed by a client application executed by one or more processing devices of the user devices 120A-120Z.

At block 202, the processing device may receive a first request from a creator to create a message 113 that references a user (example illustrated in FIG. 3). The creator may also select to send the message 113 to a group of users including the referenced user. For example, the message 113 may be a social media post in a social network platform, the message 113 may be an email in an email system, or the message 113 may be a text or video message in a text messaging system or video chat system. To send an email to other users, the user can copy the additional users on the email message, to send a post to other users, the user may share the post with a specific group of people or with the public, and/or to send a text or video message to other users, the user may share a text or multimedia (e.g., image and/or video) message with a specific group of people or with other participants of a video chat.

The creator may select to create the message 113 via options provided by the user interface 124A of the messaging platform 118A. Within the content of the message 113, the creator may reference a user using a visual indicator (e.g., hashtag, plus sign, etc.) that causes the referenced user to be associated with the message 113. Further, the creator may select to make the message 113 a particular message type, such as a celebratory or congratulatory message. Choosing this particular message type may cause various options for sharing rights 115 to the message 113 with the referenced user to be presented via the user interface 124A. The creator can select one or more of the rights 115, as described further below.

At block 204, the processing device may receive a second request from the creator of the message to share the one or more rights 115 of the creator of the message 113 with the user referenced in the message 113 (example illustrated in FIG. 3). In some embodiments, the second request and the first request may be combined into a single request and/or received at the same time. Alternatively, the message referencing the user may be an existing message, and therefore the first request may not be used and only the second request may be received with respect to the existing message referencing the user. The rights 115 may specify one or more of whether the referenced user can receive feedback notifications to feedback (e.g., comments, responses, reactions, etc.) related to the message 113, whether the user can control visibility of feedback on the message 113 by other users, whether the user can control allowing feedback on the message 113, and/or what type of feedback is allowed for the message 113.

The second request may include a property indicating a type of message that specifies to share the one or more rights 115 of the creator of the message 113 with the user identified (e.g., reference) in the message. In an implementation, the creator can select this property when creating the message 113 via the user interface 124A, and the creator selecting to send the message 113 may cause the first and second requests to be sent from a user device 120A of the creator and received by the processing device.

In an implementation, the user referenced in the message 113 may select to request the rights 115 via an option related to the message 113 provided by the user interface 124B. This scenario may occur when the creator did not request to share the rights 115 or forgot to request to share the rights 115. The processing device may receive, from a user device 120B of the user, a request for the creator to share the one or more rights 115 with the user. The processing device may send a notification to the user device 120A of the creator of the message 113, and the notification may request whether the creator desires to share the one or more rights 115 with the user referenced in the message 113. If the creator selects to share the rights 115, the processing device may receive the second request from the creator of the message 113 to share the rights 115 with the user referenced in the message 113. If the creator declines to share the rights 115, then the rights 115 may not be shared with the user.

In an implementation, the processing device may analyze content of the message to identify one or more keywords (e.g., "congratulations," "well done," "way to go," etc.) indicative of a particular message type (e.g., celebratory, congratulatory, etc.). The processing device may send a notification to the creator of the message 113 in response to determining that the message 113 is the particular message type. The notification may request whether the creator desires to share one or more rights 115 with the user referenced in the message 113. If the creator selects to share the rights 115, the processing device may receive the second request from the creator of the message 113 to share the rights 115 with the user referenced in the message 113. If the creator declines to share the rights 115, then the rights 115 may not be shared with the user.

In some implementations, a user to which the message 113 is sent may view the message and determine that they should be referenced in the message. The user interface 124B may provide an option for the user to request to be referenced in the message 113. The processing device may receive the request and send a notification to the user interface 124A of the creator to request whether the creator desires to reference the user in the message 113. If the creator selects to reference the user, the user may be referenced in the message 113. Further, the creator may be presented with the options to share the rights 115 with the user. If the creator selects to share the rights 115, the processing device may receive the second request from the creator of the message 113 to share the rights 115 with the user referenced in the message 113.

In some implementations, the message 113 referencing the user may not be set to the particular message type when created. Other users may respond to the message 113 by commenting or reacting, etc. The processing device may analyze the content of the responses (e.g., via keywords, etc.), and if the content satisfies criteria (e.g., includes certain keywords indicating a celebratory or congratulatory message), the processing device may send a notification to the creator of the message 113 in response to determining that the message 113 is the particular message type. The notification may request whether the creator desires to share one or more rights 115 with the user referenced in the message 113. If the creator selects to share the rights 115, the processing device may receive the second request from the creator of the message 113 to share the rights 115 with the user referenced in the message 113. If the creator declines to share the rights 115, then the rights 115 may not be shared with the user.

In some implementations, viewers (e.g., a referenced user in the message 113 and/or a non-referenced user in the message 113) of responses (e.g., comments, reactions, etc.) to the message 113 may determine that the message 113 should be set to the particular message type and recommend the message 113 be set to the particular message type. Accordingly, in some embodiments, the user interface 124B may provide an option for the user to send a notification to the creator of the message to set the message 113 to the particular message type and share the one or more rights 115. The processing device may receive the notification and send another notification to the user interface 124A of the creator to request whether the creator desires to set the message 113 to the particular message type and/or to share one or more rights 115 with the user referenced in the message 113. If the creator selects to set the message 113 to the particular message type and share the rights 115, the processing device may receive the second request from the creator of the message 113 to share the rights 115 with the user referenced in the message 113. If the creator declines to share the rights 115, then the rights 115 may not be shared with the user.

At block 206, the processing device may, in response to the second request, send a notification to the user referenced in the message 113 (example illustrated in FIG. 4). The notification may be sent to the user device 120B of the user and presented on the user interface 124B. The notification may include an option to accept or decline the one or more rights 115 requested to be shared by the creator of the message 113.

If the user selects to accept one or more of the rights 115, at block 208, the processing device may receive an acceptance of the one or more rights 115. If accepted, the rights 115 may be granted to the user referenced in the message 113. If the user chooses to decline one or more of the rights 115, the processing device may receive a declination of the one or more rights 115. If declined, the rights 115 may not be granted to the user referenced in the message 113.

In some implementations, the acceptance of the one or more rights may also include setting one or more rules 117 specifying by the user. The rules 117 may specify one or more of sending notifications related to any responses to the message 113 to a subset of the users to which the message 113 is sent, controlling visibility of the message 113, controlling visibility of feedback to the message 113, controlling whether feedback is allowed for the message 113, controlling what type of feedback is allowed for the message 113, and/or controlling who can provide feedback for the message 113.

At block 210, the processing device may perform one or more operations related to the message 113 based on the one or more rights 115 accepted by the user (examples illustrated in FIG. 6-9). Also, the operations may be performed based on the user rules 117 created by the user applying the rights 115. In an implementation, the one or more operations may include sending a feedback notification, based on feedback related to the message 113, to the user device 120B of the user referenced in the message 113 based on the one or more rights 115 accepted by the user and/or rules 117 set up by the user. In another implementation, the one or more operations may be performed in response to feedback (e.g., comment, reaction, etc.) provided by other users on the message 113, and the operations may enhance privacy and/or reduce traffic over the network 130. For example, the one or more operations may enhance privacy of the user referenced in the message 113 by preventing other users from seeing the message 113 based on a rule 117 set by the user applying the one or more rights 115, and/or by preventing other users from seeing feedback to the message 113 based on another rule 117 set by the user applying the one or more rights 115. In another example, the one or more operations may reduce message traffic over the network 130 by sending a feedback notification exclusively to the user referenced in the message 113 in response to a second user providing feedback to the message 113 via the user interface 124C of the user device 120C.

FIG. 3 illustrates an example post 300 referencing a user 302 (User B) where the post 300 provides options 304 for sharing rights 115 with the referenced user 302, in accordance with one implementation of the disclosure. In the depiction, the post 300 is an example of the message 113. In another example, an email may be used as an example of the message 113. Although just one user 302 is referenced in the post 300, it should be appreciated that any suitable number of users may be referenced and similar techniques may be applied. In the illustration, a creator 306 (User A) has selected an option from a messaging platform 118A-118Z (e.g., social network platform) to create the post 300, and a post editing window 308 presents the post 300 in the user interface 124A of the user device 120A of the creator 306.

The creator 306 has entered the content (e.g., "Congratulations+User B on the successful product launch!") of the post 300 and referenced the user 302 within the content of the post 300 using a symbol (e.g., plus sign) within the editing window 308. The user interface 124A presenting the post 300 may include an option 310 in the post editing window 308 to set a property indicating a type of message. The type of message can include celebratory, congratulatory, or the like. It should be appreciated that any suitable type of message may be used that is desirable to allow sharing rights with the user referenced in the message. In response to selecting (represented by the darkened radio button) the particular type of message, the editing window 308 may present options 304 for sharing rights 115 of the creator 306 with the user 302 referenced in the message.

As depicted, the options 304 may include sharing rights 115 related to receiving feedback notifications to feedback (e.g., comments, reactions, etc.) related to the post 300, controlling whether the post 300 and/or the feedback to the post 300 are visible to other users, and/or controlling whether feedback to the post 300 is allowed. The creator 306 can select one or more of the options 304. In the depicted example, the creator 306 selects (represented by the darkened radio buttons) every option 304. In some implementations, selecting the options may cause a request to be sent to the server 112A-112Z running the messaging platform 118A-118Z from the creator 306 of the post 300 to share the selected rights 115 with the user 302 referenced in the message. The server 112A-112Z may send one or more notifications to the referenced user 302 where the notifications include options to accept or decline the rights 115.

For example, FIG. 4 illustrates an example notification 400 requesting a user 302 referenced in a post 300 to accept or decline shared rights 115, in accordance with one implementation of the disclosure. The notification 400 may be received from the server 112A-112Z and presented to the user 302 in the user interface 124B of the user device 120B of the user 302 logged into the messaging platform 118A-118Z (e.g., social network platform). As depicted, the notification 400 notifies the user 302 that one or more rights have been shared with the user 302 ("User B you have been mentioned in a post and right(s) have been shared with you, please accept or decline), and provides options 402 to accept or decline each of the rights 115. The user 302 may select the appropriate button to accept or decline the shared rights 115. The acceptance or declination of the rights 115 may be sent from the user device 120B to the server 112A-112Z. If the user accepts the rights 115, the rights 115 may be granted to the referenced user 302. If the user declines the rights 115, the rights may not be granted to the referenced user 302.

Figure 5:
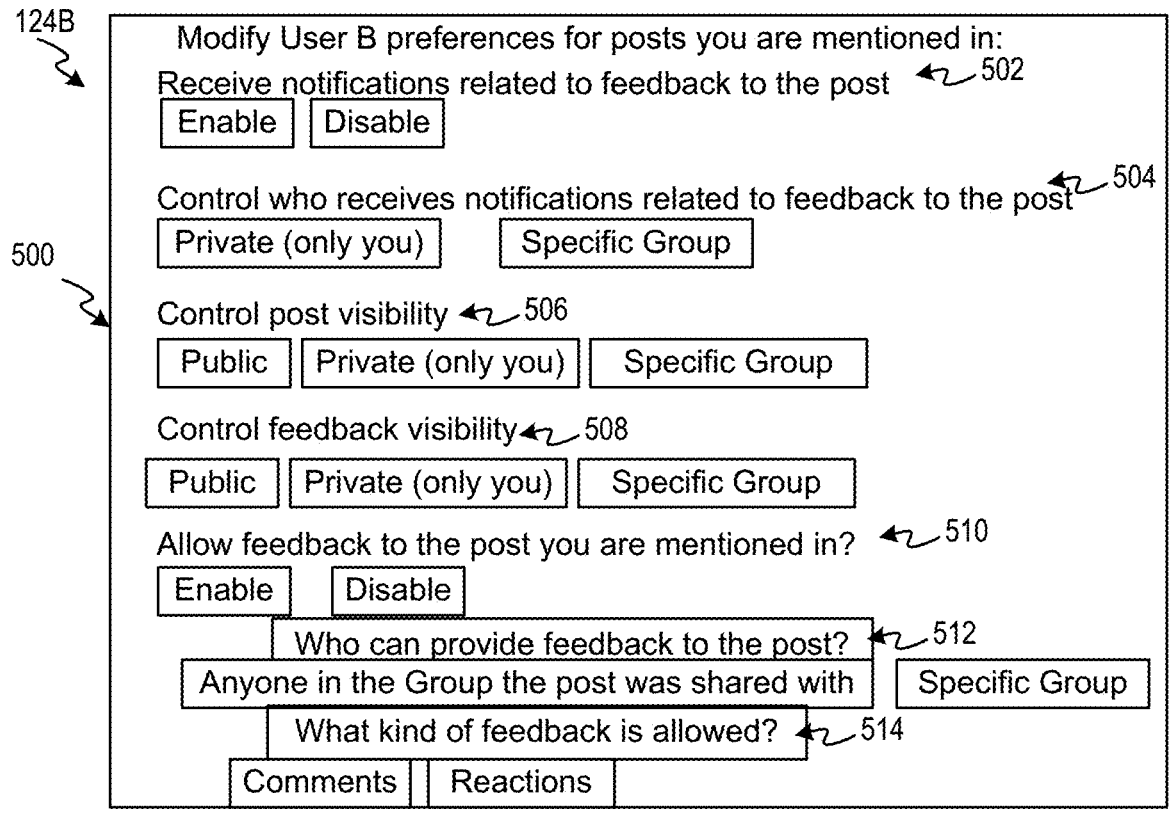
FIG. 5 illustrates example options available for a user to specify user rules for posts in which the user is referenced, in accordance with one implementation of the disclosure.

FIG. 5 illustrates example options 500 available for a referenced user 302 to define the user rules 117 for posts 300 in which the user 302 is referenced, in accordance with one implementation of the disclosure. The options 500 may be presented in the user interface 124B of the user device 120B of the user 302 logged into the messaging platform 118A-118Z (e.g., social network platform). Although the depicted example, shows options 500 for creating user rules 117 applicable to any post the user 302 is mentioned in, it should be appreciated that the user rules 117 may be tailored to be applied to any or just a particular post 300 where the user 302 is granted the rights 115 and the user 302 is referenced, to posts 300 where the referenced user 302 is granted the rights 115 and the posts 300 are made by a certain creator 306, to posts 300 where the referenced user 302 is granted the rights 115 and the posts 300 are sent to a particular user, or group of users, and the like.

In the depicted example, a user rule 502 may specify whether the user 302 enables or disables receiving notifications related to feedback to the post 300. If the user 302 enables receiving notifications, then any time another user comments on and/or reacts to (e.g., "likes") the post 300 in which the user 302 is referenced, the user 302 may receive a notification (examples illustrated in FIGS. 6-9).

Another user rule 504 may allow the user to specify who receives notifications related to feedback to the post 300. For example, a rule 504 may be created in response to the user 302 specifying that the notifications related to feedback to the post 300 are to be sent exclusively to the user 302 referenced in the post 300 (e.g., excluding any other users associated with the post 300). Such a rule may reduce message traffic over the network by not sending notifications to the creator 306 or other users associated with the post 300. The user rule 504 may also specify sending the feedback notifications to a specific group of users (e.g., the creator 306 and the user 302, other users, etc.).

Another user rule 506 may specify which users the user 302 desires to view the post 300. For example, the user 302 can specify that any user (e.g., public) can view the post 300, just the user 302 (e.g., private) can view the post 300, or a subset of users (e.g., a specific group) can view the post 300. This user rule 506 may result in reducing the number of messages sent over the network 130 when the user rule 506 restricts which users can view the post 300 because just those specified users may receive and view the post 300. Also, this user rule 506 may also result in enhancing the privacy of certain data included in the post 300 by restricting who can view the post 300.

Another user rule 508 may specify which users the user 302 desires to view the feedback (e.g., comments, reactions, etc.) to the post 300. For example, the user 302 can specify that any user (e.g., public) can view the feedback to the post 300, just the user 302 (e.g., private) can view the feedback to the post 300, or a subset of users (e.g., a specific group) can view the feedback to the post 300. This user rule 508 may also result in reducing the number of messages sent over the network 130 when the user restricts which users can view the feedback to the post 300 because just those specified users may receive and view feedback to the post 300. Also, this user rule 508 may also result in enhancing the privacy of certain data included in the feedback to the post 300 by restricting who can view the feedback to the post 300.

Another user rule 510 may specify whether the user 302 allows feedback to the post 300 in which the user 302 is mentioned. For example, the user rule 510 can enable or disable allowing feedback to the post 300. If the user rule 510 enables posting feedback, another rule 512 can be created (e.g., based on addition user input) to specify which users can provide feedback to the post. For example, the user rule 512 can specify that any one of the users with whom the post 300 was shared can provide feedback to the post 300. Alternatively, the user rule 512 can specify that just a specific group of users can provide feedback to the post 300. Further, if the user rule 510 enables posting feedback, another rule 514 can be created (e.g., based on additional user feedback) to specify what kind of feedback is allowed. For example, the user rule 514 can specify that comments on the post 300 are allowed, reactions to the post are allowed, etc. In instances where the message 113 is an email, this user rule 514 may specify that responses to the email are allowed.

In another implementation, another rule can be created (e.g., based on user input) specifying that that certain non-user applications (e.g., "bots") from certain trusted sources can view and/or provide feedback to the post 300, while other non-user applications from untrusted sources cannot view and/or provide feedback to the post 300. Additionally or alternatively, another rule can be created (e.g., based on our input) to specify that certain non-user applications can view and/or provide feedback to posts 300 related to various topics. In such an instance, the server 112A-112Z may analyze the content of the post 300 to determine whether the topic of the post 300 can be viewed and/or interacted with. Also, in some instances, the creator 306 of the post 300 may specify the topic of the post 300 when creating the post 300, and the server 112A-112Z may use the specified topic to determine whether to allow viewing and/or providing feedback to the post 300 by the non-user applications.

Figure 6:
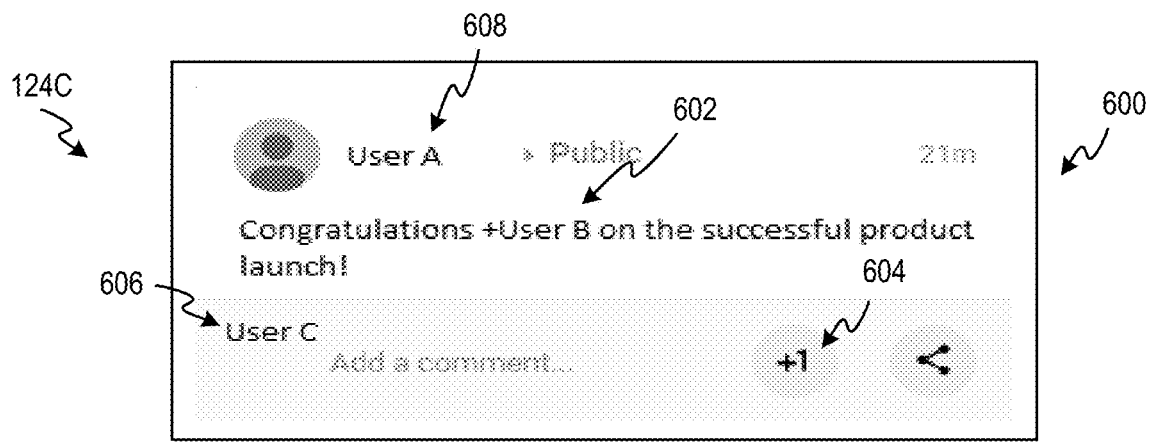
FIG. 6 illustrates an example post that references a user and provides an option to positively react to the post to another user, in accordance with one implementation of the disclosure.

FIG. 6 illustrates an example post 600 that references a user 602 (User B) and provides an option 604 to positively react to the post 600 to another user 606 (User C), in accordance with one implementation of the disclosure. The post 600 may be entered by a creator 608 (User A) and shared with a group of users (e.g., the public). The post 600 includes content that says "Congratulations+User B on the successful product launch!" and references the user 602 "User B" by using a visual indicator (e.g., plus sign) to associate the post 600 with the user 602. The creator 608 may specify the property for the post 600 indicating that the post 600 is a particular type of message (e.g., congratulatory). Further, the creator 608 may specify that the rights 115 be shared with the user 602 referenced. For example, the creator 608 may select to share the right to receive notifications related to feedback provided by other users. In an implementation, the user 602 referenced may be prompted to accept or decline the shared rights 115. In the illustrated example, the user 602 may accept the shared right 115 to receive the response notifications.

The other user 606 may select the option 604 to positively react to the post 600 congratulating the referenced user 602 in the user interface 124C of the user device 124C of the user 606. The server 112A-112Z may receive the reaction from the user device 120C and send a notification to the user device 120B of the user 602 referenced.

Figure 7:
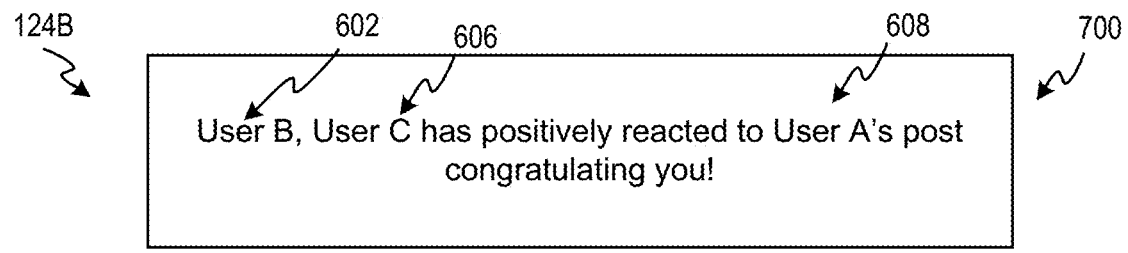
FIG. 7 illustrates an example notification sent to the user referenced in the post when the other user positively reacts to the post referencing the user, in accordance with one implementation of the disclosure.

For example, FIG. 7 illustrates an example notification 700 sent to the user 602 (User B) referenced in the post 600 when the other user 606 (User C) positively reacts to the post referencing the user 602, in accordance with one implementation of the disclosure. The notification 700 may be presented in the user interface 124B of the user device 120B of the referenced user 602. As depicted, the notification 700 includes content that says "User B, User C has positively reacted to User A's post congratulating you!" In this way, the user 602 referenced in the post 600 can receive notifications when other users react to the post 600.

Figure 8:
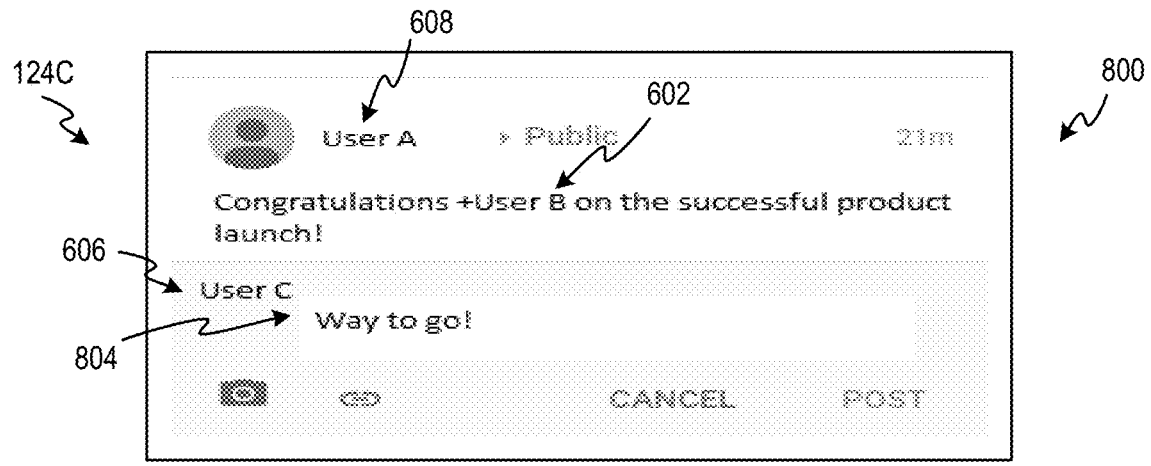
FIG. 8 illustrates an example post that references a user and provides an option to respond to the post to another user, in accordance with one implementation of the disclosure.

FIG. 8 illustrates an example post 800 that references a user 602 (User B) and provides an option 804 to comment on the post 800 to another user 606 (User C), in accordance with one implementation of the disclosure. The other user 606 (User C) may be viewing the post 800 on the user interface 124C of the user device 120C. The post 800 may be created based on input by a creator 608 (User A) and shared with a group of users (e.g., the public). The post 800 includes content that says "Congratulations+User B on the successful product launch!" and references the user 602 "User B" by using a symbol (e.g., plus sign) to associate the post 800 with the user 802. The creator 608 may set the property for the post 800 indicating that the post 800 is a particular type of message (e.g., congratulatory). Further, the creator 608 may request to share the rights 115 with the user 602 referenced. For example, the creator 608 may request to share the right to receive notifications related to feedback provided by other users. In an implementation, the user 602 referenced may be prompted to accept or decline the shared rights 115. In the illustrated example, the user 602 may accept the shared right 115 to receive the response notifications.

The other user 606 (User C) may select the option 804 to comment on the post 600 and may post a comment that says "Way to go!" in the user interface 124C of the user device 120C of the user 606. The server 112A-112Z may receive the comment from the user device 120C and send a notification to the user device 120B of the user 602 referenced.

For example, FIG. 7 illustrates an example notification 700 sent to the user 602 (User B) referenced in the post 600 when the other user 606 (User C) positively reacts to the post referencing the user 602, in accordance with one implementation of the disclosure.

Figure 9:
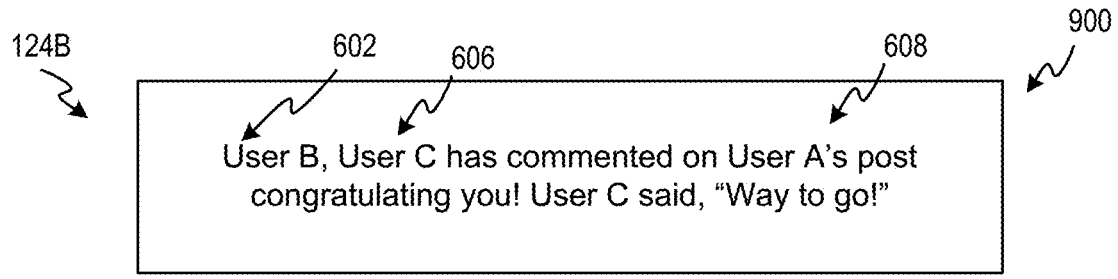
FIG. 9 illustrates an example notification sent to the user referenced in the post when the other user responds to the post referencing the user, in accordance with one implementation of the disclosure.

FIG. 9 illustrates an example notification 900 sent to the user 602 (User B) referenced in the post 800 when the other user 606 (User C) responds to the post referencing the user 602, in accordance with one implementation of the disclosure. The notification 900 may be presented in the user interface 124B of the user device 120B of the referenced user 602. As depicted, the notification 700 includes content that says "User B, User C has commented on User A's post congratulating you! User C said, 'Way to go!' In this way, the user 602 referenced in the post 800 can receive notifications when other users comment on the post 800.

Figure 10:
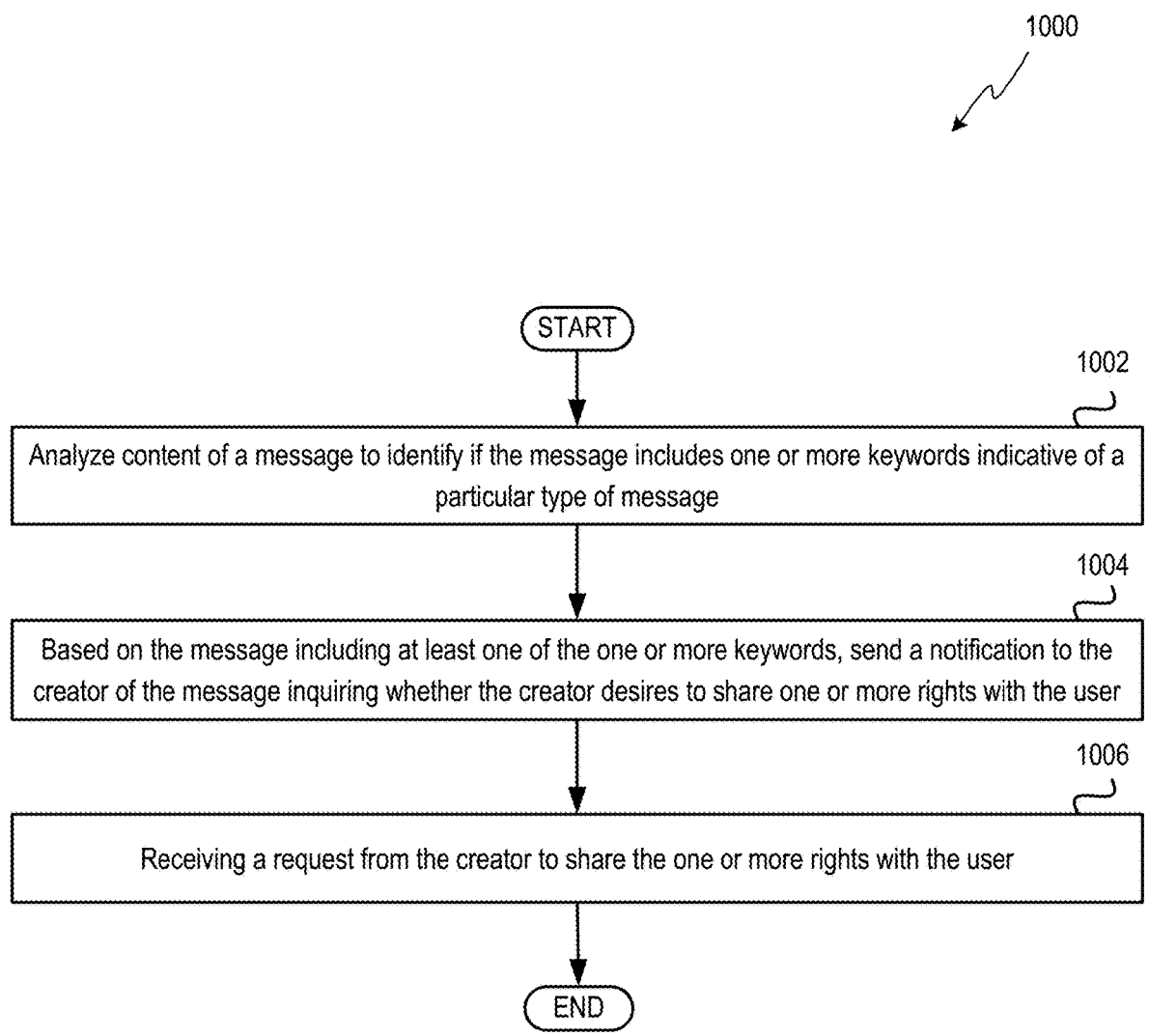
FIG. 10 depicts a flow diagram of aspects of a method for analyzing content of a message and sending a notification to a creator of the message inquiring whether the creator desires to share rights with a user referenced in the message, in accordance with one implementation of the disclosure.

FIG. 10 depicts a flow diagram of aspects of a method 1000 for analyzing content of a message 113 and sending a notification to a creator of the message 113 inquiring whether the creator desires to share rights 115 with a user referenced in the message 113, in accordance with one implementation of the disclosure. Method 1000 may be performed in the same or a similar manner as described above in regards to method 200. In one implementation, one or more of the operations described with reference to method 1000 may be performed by messaging platform 118A-118Z executed by one or more processing devices of the servers 112A-112Z. In another implementation, one or more of the operations described with reference to method 1000 may be performed by a processing device of the user device 120A-120Z.

Prior to method 1000 beginning, a creator may enter a message 113, reference a user in the message 113, and request that the message 113 be sent to a group of users (e.g., the referenced user, other users, the creator, etc.). In some implementations, the creator may not specify the property that indicates the message 113 has the type that allows sharing rights with the referenced user.

At block 1002, the processing device may analyze content of a message 113 to identify if the message 113 includes one or more keywords indicative of the particular type of message that allows sharing rights with the referenced user. In some embodiments, the keywords may include words indicative of congratulating the user or celebrating the user. The processing device may parse the content and do string comparisons of the words in the content to the one or more keywords. If there is a match with one or more words in the content of the message 113 and the one or more keywords, the processing device may determine that the message is a candidate for the particular type of message.

As a result, at block 1004, the processing device may, based on the message 113 including at least one of the one or more keywords, send a notification to the creator of the message 113 inquiring whether the creator desires to share one or more rights with the referenced user. The notification may enable the creator to select which rights (e.g., receive message/feedback notifications, control message/feedback visibility, control aspects related to feedback, etc.) should be shared with the referenced user. In some instances, the creator may select to not share any rights 115 with the referenced user. Upon selection, the user device 102A of the creator may send a response to the server 112A-112Z.

In another implementation, if the message 113 is not set to the type of message that allows sharing rights 115, the processing device may identify the user referenced in the message 113 and perform a search via the Internet using the identity of the referenced user. In some embodiments, the search may be performed via a company intranet, portal, work suite of productivity applications (e.g., collaborative document platform), content sharing platform, or the like. If the results indicate the user published a recent article, developed a recent product, accomplished something recently, or did something else worth congratulating and/or celebrating, the processing device may determine that this message is intended to congratulate and/or celebrate the referenced user. As a result, the processing device may send the notification to the creator of the message 113 inquiring whether the creator desires to share one or more of the rights with the referenced user.

At block 1006, the processing device may receive a request from the creator to share the one or more rights 115 with the referenced user. In response to the request, the processing device may send a notification to the user referenced in the message 113 including an option for the user to accept or decline the one or more rights 115. The rights 115 that are accepted by the referenced user may be granted to the referenced user. The referenced user can view the rights 115 to decide whether user rules 117 should be created.

Figure 11:
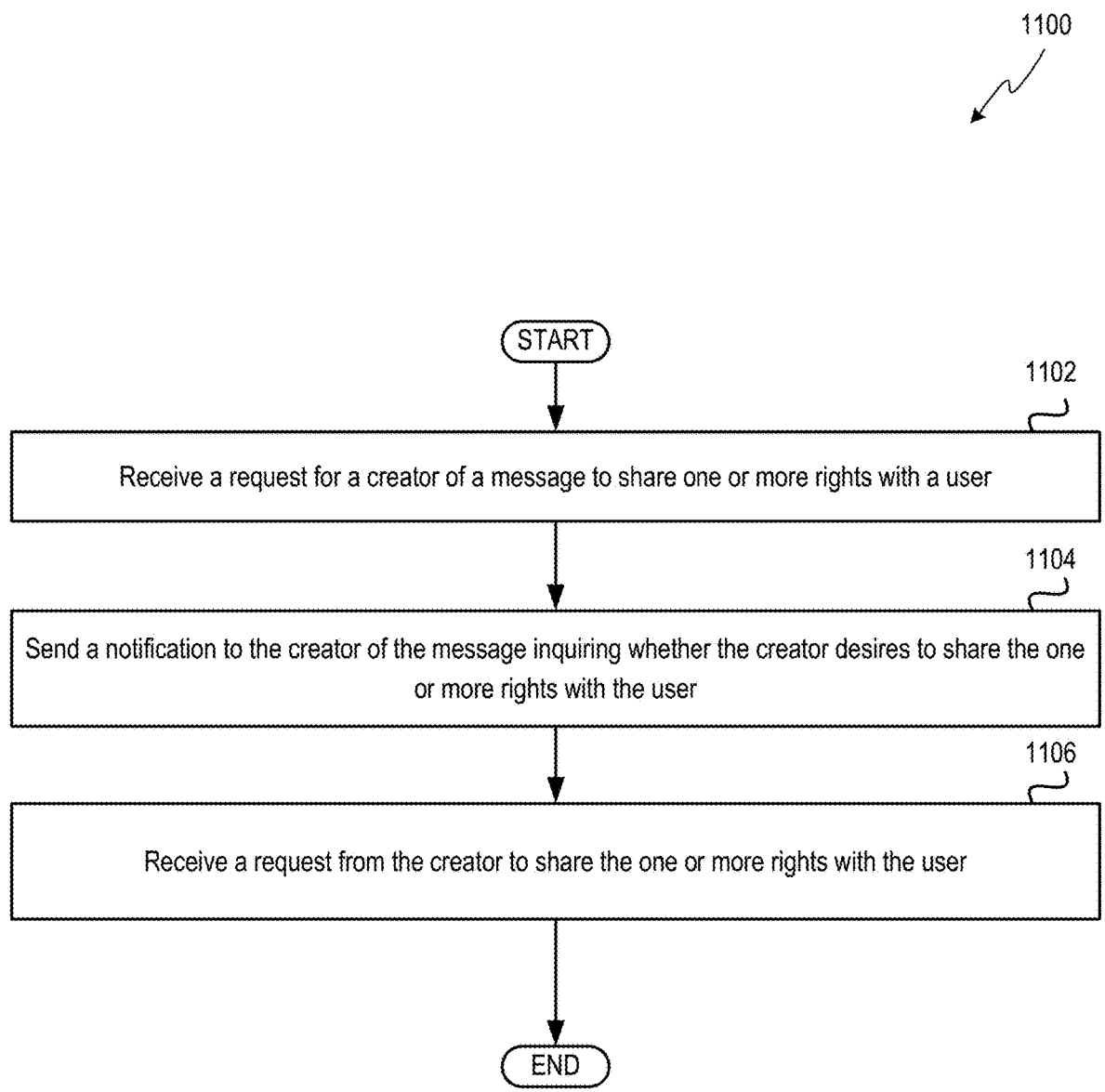
FIG. 11 depicts a flow diagram of aspects of a method to allow a user to request a creator to share rights to a message in which the user is referenced, in accordance with one implementation of the disclosure.

FIG. 11 depicts a flow diagram of aspects of a method 1100 to allow a user to request that a creator share rights 115 to a message 113 in which the user is referenced, in accordance with one implementation of the disclosure. Method 1100 may be performed in the same or a similar manner as described above in regards to method 200. In one implementation, one or more of the operations described with reference to method 1100 may be performed by messaging platform 118A-118Z executed by one or more processing devices of the servers 112A-112Z. In another implementation, one or more of the operations described with reference to method 1100 may be performed by a processing device of the user device 120A-120Z.

Prior to method 1100 beginning, a creator may enter a message 113, reference a user in the message 113, and request that the message 113 be sent to a group of users (e.g., the referenced user, other users, the creator, etc.). In some implementations, the creator may not specify the property that indicates the message 113 has the type that allows sharing rights with the referenced user. The message 113 may be presented on the user interface 124B of the user device 120B of the user referenced in the message 113, as well as any other user interface of user devices of other users to which the message is sent 113. The user interface 124B may provide a selectable option for the user referenced in the message to request the one or more rights 115 to the message 113. In some instances, the referenced user may desire to have control over aspects of the message 113 and/or feedback to the message 113. Thus, the referenced user may select the selectable option to request the rights 115 from the creator of the message 113, and a request may be sent to the server 112A-112Z.

At block 1102, the processing device may receive the request for a creator of the message 113 to share the one or more rights 115 with the user. At block 1104, the processing device may send a notification to the creator of the message inquiring whether the creator desires to share the one or more rights 115 with the user. The creator may select to grant every right 115 requested, a subset of the rights 115 requested, or none of the rights 115 requested. The selections of the creator may be sent as a request to share the rights 115 from the user device 120A of the creator to the server 112A-112Z.

At block 1106, the processing device may receive the request from the creator to share the one or more rights 115 with the referenced user. In response to receiving the request, the processing device may send a notification to the user referenced in the message 113 including one or more options to accept or decline the shared rights 115. The rights 115 that are accepted by the referenced user may be granted to the referenced user. The referenced user can apply the rights 115 to create user rules 117.

Figure 12:
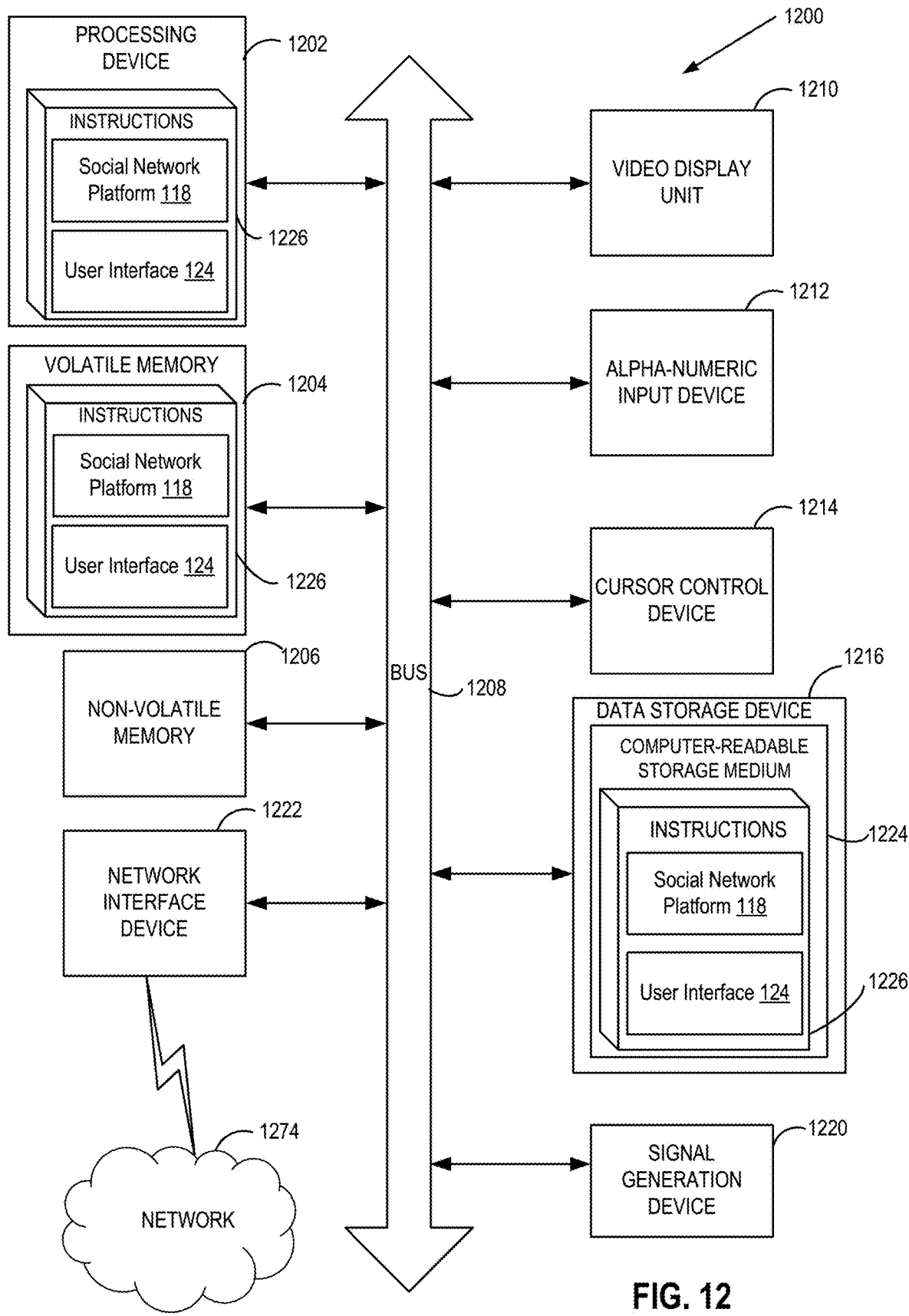
FIG. 12 depicts a block diagram of an example computing system operating in accordance with one or more aspects of the present disclosure.

FIG. 12 depicts a block diagram of an example computing system operating in accordance with one or more aspects of the present disclosure. In various illustrative examples, computer system 1200 may correspond to any of the computing devices within system architecture 100 of FIG. 1. In one implementation, the computer system 1200 may be each of the servers 112A-112Z. In another implementation, the computer system 1200 may be each of the user devices 120A-120Z.

In certain implementations, computer system 1200 may be connected (e.g., via a network, such as a Local Area Network (LAN), an intranet, an extranet, or the Internet) to other computer systems. Computer system 1200 may operate in the capacity of a server or a client computer in a client-server environment, or as a peer computer in a peer-to-peer or distributed network environment. Computer system 1200 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1200 may include a processing device 1202, a volatile memory 1204 (e.g., random access memory (RAM)), a non-volatile memory 1206 (e.g., read-only memory (ROM) or electrically-erasable programmable ROM (EEPROM)), and a data storage device 1216, which may communicate with each other via a bus 1208.

Processing device 1202 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1200 may further include a network interface device 1222. Computer system 1200 also may include a video display unit 1210 (e.g., an LCD), an alphanumeric input device 1212 (e.g., a keyboard), a cursor control device 1214 (e.g., a mouse), and a signal generation device 1220.

Data storage device 1216 may include a non-transitory computer-readable storage medium 1224 on which may store instructions 1226 encoding any one or more of the methods or functions described herein, including instructions implementing the messaging platform 118 (118A-118Z) and/or the user interface 124 (124A-124Z) of FIG. 1 for implementing the methods described herein.

Instructions 1226 may also reside, completely or partially, within volatile memory 1204 and/or within processing device 1202 during execution thereof by computer system 1200, hence, volatile memory 1204 and processing device 1202 may also constitute machine-readable storage media.

While computer-readable storage medium 1224 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method comprising:
   receiving, at a server of a platform, a request of a creator of a message to share one or more rights of the creator of the message with a user who is referenced in content of the message, wherein the one or more rights relate to the message, wherein the message is to be distributed to a plurality of users of the platform, and wherein the plurality of users of the platform include the user who is referenced in the message;
   sending, by the server, a notification identifying the one or more rights related to the message to the user who is referenced in the content of the message, wherein the one or more rights specify at least one of: whether the user referenced in the content of the message is to receive feedback notifications of feedback related to the message, whether the user referenced in the content of the message is to control visibility of feedback on the message by other users, or whether the user referenced in the content of the message is to control allowing feedback on the message; and
   performing, by the server, one or more operations related to the message based on the one or more rights accepted by the user referenced in the content of the message.

2. The method of claim 1, wherein the message is at least one of a social media post in a social network platform, an email in an email system, or a text or multimedia message in a text messaging platform or a video conferencing platform.

3. The method of claim 1, wherein performing the one or more operations comprises sending a feedback notification, based on feedback related to the message, to the user based on the one or more rights accepted by the user.

4. The method of claim 1, wherein performing one or more operations comprises preventing other users of the plurality of users from seeing the message based on a first rule set by the user with respect to the one or more rights, or preventing other users of the plurality of users from seeing feedback to the message based on a second rule set by the user with respect to the one or more rights.

5. The method of claim 1, wherein performing the one or more operations comprises one or more of: sending a feedback notification exclusively to the user referenced in the message in response to a second user of the plurality of users providing feedback to the message; or sending a feedback notification exclusively to the creator and the user referenced in the message in response to a second user of the plurality of users providing feedback to the message.

6. The method of claim 1, further comprising receiving, from a user device of the user, acceptance of the one or more rights.

7. The method of claim 1, wherein the request includes a property indicating the message being of a type of message that specifies sharing of the one or more rights of the creator of the message with the user identified in the message.

8. The method of claim 1, further comprising:
   analyzing the content of the message to identify if the message comprises one or more keywords indicative of a particular type of message; and
   based on the message comprising at least one of the one or more keywords, sending a notification to the creator of the message, wherein the notification sent to the creator inquires whether the creator desires to share the one or more rights with the user.

9. The method of claim 1, wherein the one or more operations are performed in response to a second user of the plurality of users providing feedback on the message, wherein the feedback comprises a reaction or a comment.

10. A system comprising:
    a memory; and
    a processing device, coupled to the memory, to perform operations comprising:
    receiving, at a server of a platform, a request of a creator of a message to share one or more rights of the creator of the message with a user who is referenced in content of the message, wherein the one or more rights relate to the message, wherein the message is to be distributed to a plurality of users of the platform, and wherein the plurality of users of the platform include the user who is referenced in the message;

sending, by the server, a notification identifying the one or more rights related to the message to the user who is referenced in the content of the message, wherein the one or more rights specify at least one of: whether the user referenced in the content of the message is to receive feedback notifications of feedback related to the message, whether the user referenced in the content of the message is to control visibility of feedback on the message by other users, or whether the user referenced in the content of the message is to control allowing feedback on the message; and performing, by the server, one or more operations related to the message based on the one or more rights accepted by the user referenced in the content of the message.

11. The system of claim 10, wherein performing the one or more operations comprises one or more of: sending a feedback notification, based on feedback related to the message, to the user based on the one or more rights accepted by the user, preventing other users of the plurality of users from seeing the message based on a first rule set by the user with respect to the one or more rights, preventing other users of the plurality of users from seeing feedback to the message based on a second rule set by the user with respect to the one or more rights, sending a feedback notification exclusively to the user referenced in the message in response to a second user of the plurality of users providing feedback to the message, or sending a feedback notification exclusively to the creator and the user referenced in the message in response to a second user of the plurality of users providing feedback to the message.

12. The system of claim 10, the operations further comprising receiving, from a user device of the user, acceptance of the one or more rights.

13. The system of claim 10, wherein the request includes a property indicating the message being of a type of message that specifies sharing of the one or more rights of the creator of the message with the user identified in the message.

14. The system of claim 10, the operations further comprising:
analyzing the content of the message to identify if the message comprises one or more keywords indicative of a particular type of message; and
based on the message comprising at least one of the one or more keywords, sending a notification to the creator of the message, wherein the notification sent to the creator inquires whether the creator desires to share the one or more rights with the user.

15. The system of claim 10, wherein the one or more operations are performed in response to a second user of the plurality of users providing feedback on the message, wherein the feedback comprises a reaction or a comment.

16. A non-transitory computer readable medium comprising instructions which when performed by a processing device, cause the processing device to perform operations comprising:

receiving, at a server of a platform, a request of a creator of a message to share one or more rights of the creator of the message with a user who is referenced in content of the message, wherein the one or more rights relate to the message, wherein the message is to be distributed to a plurality of users of the platform, and wherein the plurality of users of the platform include the user who is referenced in the message;

sending, by the server, a notification identifying the one or more rights related to the message to the user who is referenced in the content of the message, wherein the one or more rights specify at least one of: whether the user referenced in the content of the message is to receive feedback notifications of feedback related to the message, whether the user referenced in the content of the message is to control visibility of feedback on the message by other users, or whether the user referenced in the content of the message is to control allowing feedback on the message; and performing, by the server, one or more operations related to the message based on the one or more rights accepted by the user referenced in the content of the message.

17. The non-transitory computer readable medium of claim 16, wherein performing the one or more operations comprises one or more of: sending a feedback notification, based on feedback related to the message, to the user based on the one or more rights accepted by the user, preventing other users of the plurality of users from seeing the message based on a first rule set by the user with respect to the one or more rights, preventing other users of the plurality of users from seeing feedback to the message based on a second rule set by the user with respect to the one or more rights, sending a feedback notification exclusively to the user referenced in the message in response to a second user of the plurality of users providing feedback to the message, or sending a feedback notification exclusively to the creator and the user referenced in the message in response to a second user of the plurality of users providing feedback to the message.

18. The non-transitory computer readable medium of claim 16, the operations further comprising receiving, from a user device of the user, acceptance of the one or more rights.

19. The non-transitory computer readable medium of claim 16, wherein the request includes a property indicating the message being of a type of message that specifies sharing of the one or more rights of the creator of the message with the user identified in the message.

20. The non-transitory computer readable medium of claim 16, the operations further comprising:
analyzing the content of the message to identify if the message comprises one or more keywords indicative of a particular type of message; and
based on the message comprising at least one of the one or more keywords, sending a notification to the creator of the message, wherein the notification sent to the creator inquires whether the creator desires to share the one or more rights with the user.

* * * * *